United States Patent
Ashwin et al.

(10) Patent No.: US 7,548,901 B2
(45) Date of Patent: Jun. 16, 2009

(54) SYSTEM AND METHOD FOR DELAYED FETCHING OF DESIGNATED MEMBERS OF A USER DEFINED TYPE

(75) Inventors: Shrinivas Ashwin, Sammamish, WA (US); Christian Kleinerman, Bellevue, WA (US); Eugene Zabokritski, Redmond, WA (US); Ganapathy Krishnamoorthy, Issaquah, WA (US); Giri Nair, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 470 days.

(21) Appl. No.: 10/879,326

(22) Filed: Jun. 29, 2004

(65) Prior Publication Data

US 2005/0289160 A1 Dec. 29, 2005

(51) Int. Cl.
*G06F 17/30* (2006.01)
(52) U.S. Cl. .............................. 707/2; 707/4
(58) Field of Classification Search ....................... 707/3
See application file for complete search history.

(56) References Cited

U.S. PATENT DOCUMENTS

| | | | |
|---|---|---|---|
| 5,297,279 A | 3/1994 | Bannon et al. | 707/103 |
| 5,437,027 A * | 7/1995 | Bannon et al. | 707/103 R |
| 5,864,862 A | 1/1999 | Kriens et al. | 707/103 |
| 5,900,870 A | 5/1999 | Malone et al. | 715/866 |
| 5,907,846 A * | 5/1999 | Berner et al. | 707/103 R |
| 6,047,291 A | 4/2000 | Anderson et al. | 707/103 |
| 6,070,174 A | 5/2000 | Starek et al. | 707/206 |
| 6,108,004 A | 8/2000 | Medl | 715/804 |
| 6,112,024 A | 8/2000 | Almond et al. | 717/122 |
| 6,199,100 B1 | 3/2001 | Filepp et al. | 709/203 |
| 6,199,195 B1 | 3/2001 | Goodwin et al. | 717/104 |
| 6,223,344 B1 | 4/2001 | Gerard et al. | 717/170 |
| 6,304,909 B1 | 10/2001 | Mullaly et al. | 709/232 |
| 6,338,056 B1 | 1/2002 | Dessloch et al. | 707/2 |
| 6,370,541 B1 | 4/2002 | Chou et al. | 707/103 |
| 6,466,933 B1 * | 10/2002 | Huang et al. | 707/3 |
| 6,505,211 B1 | 1/2003 | Dessloch et al. | 707/103 Y |
| 6,519,597 B1 | 2/2003 | Cheng et al. | 707/10 |
| 6,556,983 B1 | 4/2003 | Altschuler et al. | 706/55 |
| 6,564,205 B2 | 5/2003 | Iwata et al. | 707/2 |
| 6,564,215 B1 * | 5/2003 | Hsiao et al. | 707/8 |

(Continued)

FOREIGN PATENT DOCUMENTS

WO WO 02/23317 A2 3/2002

OTHER PUBLICATIONS

Andrews, T. et al., "Combining Language and Database Advances in an Object-Oriented Development Environment", *OOPSLA Proceedings*, Oct. 4-8, 1987, 430-440.

(Continued)

*Primary Examiner*—Hosain T Alam
*Assistant Examiner*—Johnese Johnson
(74) *Attorney, Agent, or Firm*—Woodcock Washburn LLP

(57) ABSTRACT

A number of members of a user defined type may be designated as delayable members. During an initial fetch of the type, the type may be returned from the database without the delayable members, thereby preserving valuable bandwidth and reducing the amount of time required to perform the initial fetch. Upon request, selected delayable members may be re-fetched from the database at a later time without returning the other members provided during the initial fetch.

6 Claims, 10 Drawing Sheets

U.S. PATENT DOCUMENTS

| | | | | |
|---|---|---|---|---|
| 6,571,337 | B1 | 5/2003 | Xiao | 713/194 |
| 6,578,046 | B2 | 6/2003 | Chang et al. | 707/4 |
| 6,671,687 | B1 | 12/2003 | Pederson et al. | 707/9 |
| 6,708,196 | B1 | 3/2004 | Atkinson et al. | 718/102 |
| 6,772,178 | B2 | 8/2004 | Mandal et al. | 707/204 |
| 6,785,690 | B1 | 8/2004 | Davidson | 707/103 Y |
| 2002/0091702 | A1 | 7/2002 | Mullins | 707/100 |
| 2002/0152422 | A1 | 10/2002 | Sharma et al. | 714/13 |
| 2002/0198891 | A1 | 12/2002 | Li et al. | 707/102 |
| 2003/0018527 | A1* | 1/2003 | Filepp et al. | 705/14 |
| 2003/0070006 | A1* | 4/2003 | Nadler et al. | 709/330 |
| 2004/0036912 | A1 | 2/2004 | Liou et al. | 358/1.16 |

OTHER PUBLICATIONS

Bhattacharya, S. et al., "Coordinating Backup/Recovery and Data Consistency Between Database and File Systems", *ACM SIGMOD*, Jun. 4-6, 2002, 500-511.

Biliris, A., "The Performance of Three Database Storage Structures for Managing Large Objects", *ACM SIGMOD*, 1992, 276-285.

Buneman, P. et al., "Inheritance and Persistence in Database Programming Languages", *ACM*, 1986, 4-15.

Hsiao, H.I. et al., "DLFM: A Transactional Resource Manager", *MOD*, 2000, 518-528.

Khan, L. et al., "A Performance Evaluation of Storing XML Data in Relational Database Management Systems", *WIDM*, 2001, 31-38.

Leontiev, Y. et al., "On Type Systems for Object-Oriented Database Programming Languages", *ACM Computing Surveys*, Dec. 2002, 34(4), 409-449.

Melton, J. et al., "SQL and Management of External Data", *SIGMOD Record*, Mar. 2001, 30(1), 70-77.

Papiani, M. et al., A Distributed Scientific Data Archive Using the Web, XML and SQL/MED, *SIGMOD Record*, Sep. 1999, 28(3), 56-62.

Seshadri, P., "Enhanced Abstract Data Types in Object-Relational Databases", *The VLDB Journal*, 1998, 7, 130-140.

Varlamis, I. et al., "Bridging XML-Schema and Relational Databases. A System for Generating and Manipulating Relational Databases Using Valid XML Documents", *DocEng 'OL*, Nov. 9-10, 2001, 105-114.

Yoshikawa, M. et al., "XRel: A Path-Based Approach to Storage and Retrieval of XML Documents Using Relational Databases", *ACM Transactions on Internet Technology*, Aug. 2001, 1(1), 110-141.

Findler, R.B. et al., "Contract Soundness for Object-Oriented Languages" *ACM Conference on Object-Oriented Programming Systems, Languages, and Applications, OOPSLA*, 2001, 15 pages.

Harrison, C.J. et al., Structure Editors: User-Defined Type Values and Type Inference, *IEEE*, 2000, 241-247.

Michael Stonebraker, "Inclusion of New Types in Relational Data Base Systems", *IEEE International Conference on Data Engineering*, 1986, 1-19.

Berg, C., "How Do I Create Persistent Java Objects?", *Dr. Dobb's Journal*, 1997, 22(4), 98-101.

Chien, A.A., "Concurrent Aggregates (CA)-Design and Experience with a Concurrent Object-Oriented Language Based on Aggregates", *J. Parallel and Distributed Computing*, 1995, 25(2), 174-196.

Darby, C., "Object Serializatin in Java 1.1. Making Objects Persistent", *Web Techniques*, 1997, 2(9), 55, 58-59.

Frost., "Binary-Relational Storage Structures", *The Computer Journal*, 1982, 25(3), 358-367.

Fuh, Y-C. et al., "Implementation of SQL3 Structured Types with Inheritance and Value Substitutability", *Digital Symposium Collection*, 2000, Abstract Only, 2 pages.

Haverlock, K., "Object Serialization, Java, and C++", *Dr. Dobbs. Journal*, 1998, 23(8), 32, 34, 36-37.

King, et al., "TriStarp-An Investigation into the Implementation and Exploitation of Binary Relational Storage Structures", *Proc. 8 Supppl BNCOD(British National Conference on Data Bases)*, 1990, 64-84.

\* cited by examiner

```
1.  Serializable]
2.      [SqlUserDefinedType(Format.Structured, MaxByteSize=8000)]
3.      public class BaseItem: INullable
4.      {
5.              [SqlUdtField(IsNullable=false)]
6.              private SqlGuid m_ID;
7.
8.              [SqlUdtField(MaxSize=128, IsFixedLength=false)]
9.              private SqlString m_Name;
10.
11.             [SqlUdtProperty(FieldName="m_ID")]
12.             public SqlGuid ID
13.             {
14.                 get
15.                 {
16.                     return m_ID;
17.                 }
18.                 set
19.                 {
20.                     this.m_ID = value;
21.                 }
22.             }
23.
24.             [SqlUdtProperty(FieldName="m_Name")]
25.             public SqlGuid Name
26.             {
27.                 get
28.                 {
29.                     return m_Name;
30.                 }
31.                 set
32.                 {
33.                     this.m_Name = value;
34.                 }
35.             }
36.
37.             [SqlUdtField(IsNullable=true)]
38.             public MultiSet<PropertyAssociation> Properties;
39.
40.             #region UDT boilerplate
41.             public BaseItem()
42.             {
43.                 this.ID = new SqlGuid(Guid.NewGuid());
44.             }
45.             public override string ToString()
46.             {
47.                 return "ID " + this.ID;
48.             }
49.             [SqlUdtField]
50.             protected SqlBoolean m_IsNull = SqlBoolean.False;
51.             public bool IsNull { get { return this.m_IsNull.Value; } }
}
52.             public static BaseItem Null
53.             {
54.                 get
55.                 {
56.                     BaseItem s = new BaseItem();
57.
58.                     s.m_IsNull = SqlBoolean.True;
59.                     return s;
60.                 }
61.             }
62.             public static BaseItem Parse(SqlString s)
63.             {
64.                 return new BaseItem();
65.             }
66.             #endregion
67.     }
```

Fig. 1

SYSTEM AND METHOD FOR DELAYED FETCHING OF DESIGNATED MEMBERS OF A USER DEFINED TYPE

FIELD OF THE INVENTION

The present invention relates to the field of data retrieval and manipulation, and, more specifically, to retrieval and manipulation of user defined types.

BACKGROUND OF THE INVENTION

Microsoft SQL SERVER is a comprehensive database management platform that provides extensive management and development tools, a powerful extraction, transformation, and loading (ETL) tool, business intelligence and analysis services, and other capabilities. Two improvements to SQL SERVER have recently been implemented. First, the Microsoft WINDOWS .NET Framework Common Language Runtime (CLR) has been integrated into the SQL SERVER database, and second, a new object, referred to as a User Defined Type (UDT), can now be created with managed code in the CLR environment and persisted in the database store.

The CLR is the heart of the Microsoft NET Framework, and provides the execution environment for all .NET code. Thus, code that runs within the CLR is referred to as "managed code." The CLR provides various functions and services required for program execution, including just-in-time (JIT) compilation, allocating and managing memory, enforcing type safety, exception handling, thread management and security. The CLR is now loaded by SQL SERVER upon the first invocation of a NET routine.

In previous versions of SQL SERVER, database programmers were limited to using Transact-SQL when writing code on the server side. Transact-SQL is an extension of the User defined Query Language as defined by the International Standards Organization (ISO) and the American National Standards Institute (ANSI). Using Transact-SQL, database developers can create, modify and delete databases and tables, as well as insert, retrieve, modify and delete data stored in a database. Transact-SQL is specifically designed for direct structural data access and manipulation. While Transact-SQL excels at data access and management, it is not a full-fledged programming language in the way that Visual Basic .NET and C# are. For example, Transact-SQL does not support arrays, collections, for each loops, bit shifting or classes.

With the CLR integrated into the SQL SERVER database, database developers can now perform tasks that were impossible or difficult to achieve with Transact-SQL alone. Both Visual Basic NET and C# are modern programming languages offering full support for arrays, user defined exception handling, and collections. Developers can leverage CLR integration to write code that has more complex logic and is more suited for computation tasks using languages such as Visual Basic .NET and C#.

In addition to CLR integration, SQL SERVER also adds support for User Defined Types (UDT)—a new mechanism that enables a developer to extend the scalar type system of the database. UDTs provide two key benefits from an application architecture perspective: they provide strong encapsulation (both in the client and the server) between the internal state and the external behaviors, and they provide deep integration with other related server features. Once a UDT is defined, it can be used in all the contexts that a system type can be used in SQL SERVER, including in column definitions, variables, parameters, function results, cursors, triggers, and replication.

The process of defining a UDT on a database server is accomplished as follows:
  a) create a class in managed code that follows the rules for UDT creation;
  b) load the Assembly that contains the UDT into a database on the server using the CREATE ASSEMBLY statement; and
  c) create a type in the database using the CREATE TYPE statement that exposes the managed code UDT.

At this point, the UDT can be used in a table definition.

When a UDT definition is created in managed code, the type must meet the following requirements:
  a) it must be marked as Serializable;
  b) it must be decorated with the SqlUserDefinedTypeAttribute;
  c) the type should be NULL aware by implementing the INullable interface;
  d) the type must have a public constructor that takes no arguments; and
  e) the type should support conversion to and from a string by implementing the following methods:
    1. Public String ToString( ); and
    2. Public Shared <type> Parse (SqlString s).

Co-pending, commonly assigned, patent application Ser. No. 10/692,225, entitled "System And Method For Object Persistence In A Database Store", which is hereby incorporated by reference in its entirety, describes another feature of UDTs in which the fields and behaviors of a CLR class definition for a UDT are annotated with storage attributes that describe a layout structure for instances of the UDT in the database store. Specifically, each field of a CLR class that defines a UDT is annotated with a storage attribute that controls the storage facets of the type, such as size, precision, scale, etc. In one embodiment, this is achieved by annotating each field with a custom storage attribute named SqlUdtField( ). This attribute annotates fields with additional storage directives. These directives are enforced when the object is serialized to disk. In addition, every managed behavior (e.g., a method that can be invoked on the UDT object, for example, to return the value of a field) defined in the CLR class is annotated with an attribute that denotes an equivalent structural access path for that managed behavior. In one embodiment, the custom attribute used for this purpose is named SqlUdtProperty( ), and the database server (e.g., SQL SERVER) assumes that the implementation of properties annotated with this custom attribute will delegate to a field specified as part of the attribute definition. This lets the server optimize access to the property structurally without creating an instance and invoking the behavior on it.

FIG. 1 is an exemplary code listing of a CLR class that defines a UDT. As shown, the CLR class has been annotated with the SqlUdtField( ) and SqlUdtProperty( ) custom attributes as described above. Specifically, the SqlUdtField( ) custom attribute has been added at lines 5, 8, 37, and 49 to annotate the respective fields of the exemplary UDT class definition. The SqlUdtProperty( ) custom attribute has been added at lines 11 and 24 to annotate the respective managed behaviors of the class.

The CLR class that defines the UDT is then compiled into a dynamic link library (dll). An Assembly containing the compiled class may then be created using the following T-SQL script commands:

create assembly test from 'c:\test.dll' go

The following T-SQL script commands may then be used to create the UDT on the server:

create type BaseItem
external name [test]: [BaseItem]
go

Once the UDT has been created on the server, a table (e.g., "MyTable") can be created defining an attribute of the table as the UDT type, as follows:

```
create table MyTable
(
    Item BaseItem,
    ItemId as item::ID
)
go
```

A new item can be added to the table, as follows:
declare @i BaseItem
set @i=convert(BaseItem,'')
insert into MyTable values (@i)
go The UDT expression can then be used in a query such as: SELECT Item.ID, Item.Name FROM MyTable.

With the integration of the CLR into SQL SERVER and the ability to define UDTs from a class definition in managed code, applications can now instantiate objects of the type defined by the managed code class and have those objects persisted in the relational database store as a UDT. Moreover, the class that defines the UDT can also include methods that implement specific behaviors on objects of that type. An application can therefore instantiate objects of a type defined as a UDT and can invoke managed behaviors over them.

When an object of a class that has been defined as a UDT is instantiated in the CLR, the object can be persisted in the database store through the process of object serialization, wherein the values of the variables of the class are transferred to physical storage (e.g., hard disk). FIG. 2 illustrates the serialization of an object in memory to its persisted form on disk. The object may be persisted in the database store in a traditional relational database table of the format illustrated in FIG. 3. As shown, the table comprises a column of the specified UDT. The serialized values of a persisted object of the specified UDT occupy a cell of the UDT column.

Referring again to FIG. 2, when an application generates a query that includes a predicate or an expression that references a managed behavior of a UDT object that has been persisted in the database store (e.g., a behavior that returns the value of a field of the UDT object), the persisted object must be de-serialized (sometimes also referred to as "hydrating") and the CLR must allocate memory for the full object in order to receive its stored values. The CLR must then invoke the actual method (i.e., behavior) of the UDT class that returns the value(s) that is the subject of the query. As described in the aforementioned co-pending application Ser. No. 10/692,225, the SqlUdtField( ) and SqlUdtProperty( ) annotations in the CLR class definition of a UDT can be used by the database server to also allow direct structural access to the values of certain UDT fields without the need for object hydration.

One new technology that takes advantage of the CLR integration and the provision of UDTs in SQL SERVER is the storage platform described in co-pending, commonly assigned, patent application Ser. No. 10/646,646, filed Aug. 21, 2003, entitled "Storage Platform For Organizing, Searching, And Sharing Data," the disclosure of which is hereby incorporated by reference in its entirety. FIG. 4 is a block diagram illustrating the architecture of the storage platform 300 described in this co-pending application. The storage platform is sometimes referred to as "WinFS." As shown in FIG. 4, the storage platform 300 comprises a data store 302 implemented on a database engine 314. In one embodiment, the database engine comprises a relational database engine, such as the Microsoft SQL SERVER relational database engine.

The data store 302 implements a data model 304 that supports the organization, searching, sharing, synchronization, and security of data in the form of Items and relationships between items, as described more fully below. Specific types of Items are described in schemas, such as schemas 340, and the storage platform 300 provides tools 346 for deploying those schemas as well as for extending those schemas, as described more fully below.

A change tracking mechanism 306 implemented within the data store 302 provides the ability to track changes to the data store. The data store 302 also provides security capabilities 308 and a promotion/demotion capability 310. The data store 302 also provides a set of application programming interfaces 312 to expose the capabilities of the data store 302 to other storage platform components and application programs (e.g., application programs 350a, 350b, and 350c) that utilize the storage platform.

The storage platform still further comprises an application programming interface (API) 322, which enables application programs, such as application programs 350a, 350b, and 350c, to access the capabilities of the storage platform and to access the data stored in the database. The storage platform API 322 may be used by application programs in combination with other APIs, such as the OLE DB API 324 and the Microsoft WINDOWS Win32 API 326.

The storage platform 300 may also provide a variety of services 328 to application programs, including a synchronization service 330 that facilitates the sharing of data among users or systems. For example, the synchronization service 330 may enable interoperability with other data stores 340 having the same format as data store 302, as well as access to data stores 342 having other formats. The storage platform 300 also provides file system capabilities that allow interoperability of the data store 302 with existing file systems, such as the WINDOWS NTFS files system 318.

In at least some embodiments, the storage platform 320 may also provide application programs with additional capabilities for enabling data to be acted upon and for enabling interaction with other systems. These capabilities may be embodied in the form of additional services 328, such as an Info Agent service 334 and a notification service 332, as well as in the form of other utilities 336.

In at least some embodiments, the storage platform is embodied in, or forms an integral part of, the hardware/software interface system of a computer system. For example, and without limitation, the storage platform of the present invention may be embodied in, or form an integral part of, an operating system, a virtual machine manager (VMM), a Common Language Runtime (CLR) or its functional equivalent, or a Java Virtual Machine (JVM) or its functional equivalent.

Through its common storage foundation, and schematized data, the storage platform enables more efficient application development for consumers, knowledge workers and enterprises. It offers a rich and extensible programming surface area that not only makes available the capabilities inherent in its data model, but also embraces and extends existing file system and database access methods.

In the following description, and in various ones of the figures, the storage platform 300 of the present invention may be referred to as "WinFS." However, use of this name to refer to the storage platform is solely for convenience of description and is not intended to be limiting in any way.

The data model of the WinFS platform defines units of data storage in terms of Items, Item extensions, and Relationships. An "Item" is the fundamental unit of storage information. The data model provides a mechanism for declaring Items and Item extensions and for establishing relationships between Items. Items are the units that can be stored and retrieved using operations such as copy, delete, move, open, and so forth. Items are intended to represent real-world and readily-understandable units of data like Contacts, People, Services, Locations, Documents (of all various sorts), and so on. Item extensions are a way to extend the definition of an existing Item, and Relationships are a defined link between Items.

In WinFS, different Item types are defined for storing information. For example, Item types are defined for Contacts, People, Locations, Documents, etc. Each Item type is described by a schema that defines the properties and characteristics of a given Item. For example, a "Location" Item may be defined as having properties such as EAddresses, MetropolitanRegion, Neighborhood, and PostalAddresses. Once a schema is defined for a given Item type, deployment tools are used to translate the schema into a corresponding CLR class definition for that Item type, and then a UDT is created in the database store from the CLR class definition (in the manner described above) in order for instances of the WinFS Item type to be persisted in the database store. Using the WinFS API 322, applications (e.g., applications 350a, 350b, 350c, etc.) can create instances of the Item types supported by the data store in order to store and retrieve information from the storage platform data store. Each instance of an Item type stored in the data store has a unique identifier (e.g., Item_ID) associated with it; in one embodiment, each item identifier is a globally unique identifier, i.e. "guid." Thus, the WinFS platform leverages the CLR integration and UDT capabilities of the database store to provide a platform for storing Items of information.

As with any instance of a UDT in SQL SERVER, instances of WinFS Items are ultimately stored in tables of the database store in the manner illustrated in FIG. 3. Applications can then submit queries to the WinFS platform to search for and retrieve Items from the data store that satisfy the search criteria. FIG. 5 illustrates how a query is executed against the data store to retrieve instances of an Item type called "Person." In step (1), an application uses a "FindAll" method of the WinFS API 322 to initiate a query for all Items that satisfy a particular search criteria—in this case, all instances of the Person type in which the value in a "Birthday" field of the type is greater than a particular date (e.g., Dec. 31, 1999). At step (2), the WinFS API 322 translates the "FindALL" operation into a SQL query and submits it to the underlying database engine, e.g., SQL SERVER. In step (3), the database engine executes the query against the corresponding instances of the Person UDT and returns the stored values for each matching instance of the Person UDT. In this example, at step (4), ADO.Net turns the bits returned from the database store into CLR objects (i.e., the process of object hydration discussed above) and returns them to the WinFS API 322. ADO.Net is a component of the Microsoft .NET Framework that provides managed code access via the CLR to data sources such as SQL SERVER. The WinFS API then wraps the Person UDT objects and returns them to the application as Items of the Person type.

Each instance of a UDT may include a number of members which represent large objects such as, for example, digital images, video, audio, etc. Such large objects are usually stored in data type instances such as, for example, BLOB, CLOB, and NCLOB or more specifically stored in varbinary (max), varchar(max), nvarchar(max). The retrieval of large members from a database often requires a large amount of time and considerable bandwidth. Furthermore, the majority of UDT retrieval usage scenarios do not require access to large embedded members. Thus, there is a need in the art for systems and methods for delayed fetching of designated members of a UDT. It is desired that such systems and methods enable the UDT to be initially fetched without the designated members, and the designated members to be re-fetched upon request at a later time. The present invention satisfies these and other needs.

SUMMARY OF THE INVENTION

The present invention is directed to systems and methods for delayed fetching of designated members of a user defined type (UDT). The designated members may be large objects such as, for example, digital images, video, audio, etc. According to the invention, upon an initial fetch of the UDT from a database server, a serialized version of the UDT is returned in which the designated members are removed, thereby preserving valuable bandwidth and reducing the amount of time required to perform the initial fetch. Upon request, the designated members may be re-fetched from the database server at a later time and returned without the other UDT members provided during the initial fetch.

According to an aspect of the invention, the initial fetch may be executed by generating a UDT container reference that identifies a path to the UDT within an underlying database. A serialized representation of the UDT may be retrieved from the database, and the designated members may be removed from the serialized representation. The container reference may then be pre-fixed to the serialized representation, and the serialized representation may be returned to a client application.

According to another aspect of the invention, the client application may receive and de-serialize the serialized representation. As part of the de-serialization process, for each designated member, a type instance may be constructed that includes context information corresponding to the location of the designated member within the database. The context information may include the container reference to the entire UDT and an individual member path to the corresponding designated member. Each designated member may be then be re-fetched at a later time by providing its context information to the database server.

According to another aspect of the invention, during re-fetch, the designated members may be returned as they were at the time of the initial fetch. To enable this feature, an update sequence marker (USM) identifying a version of the UDT at the time of the initial fetch may also be returned to the client application along with the serialized representation. During re-fetch, the USM may be returned to the database server along with the context information. The USM may be used to identify and retrieve prior versions of the designated members at the time of the initial fetch.

According to another aspect of the invention, after the initial fetch, the entire UDT or individual designated members may be returned back to the database server. If the entire UDT is returned, then the context information is provided to the database server in place of the designated members. Upon being retuned to the database server, the context information is used to identify and replace the designated members. If only individual designated members are returned, then the context information is returned along with the a metadata annotation indicating the designated members as such.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which:

FIG. 1 is an exemplary code segment illustrating a managed code class definition for a user defined type;

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

As stated above, the present invention is directed to systems and methods for delayed fetching of designated members of a user defined type (UDT). Generally, the present invention enables specific members of a UDT, particularly members representing large objects, to be designated as delayable members. During an initial fetch of a UDT, it may be returned from a database without the delayable members, thereby preserving valuable bandwidth and reducing the amount of time required to perform the fetch. Upon request, selected delayable members may be re-fetched at a later time without returning the other members provided during the initial fetch. As should be appreciated, the process of delayed retrieval may also be referred to as a lazy materialization process, however the particular term used to refer to the systems and methods described below is not intended to limit the scope of the invention.

Figure 2:
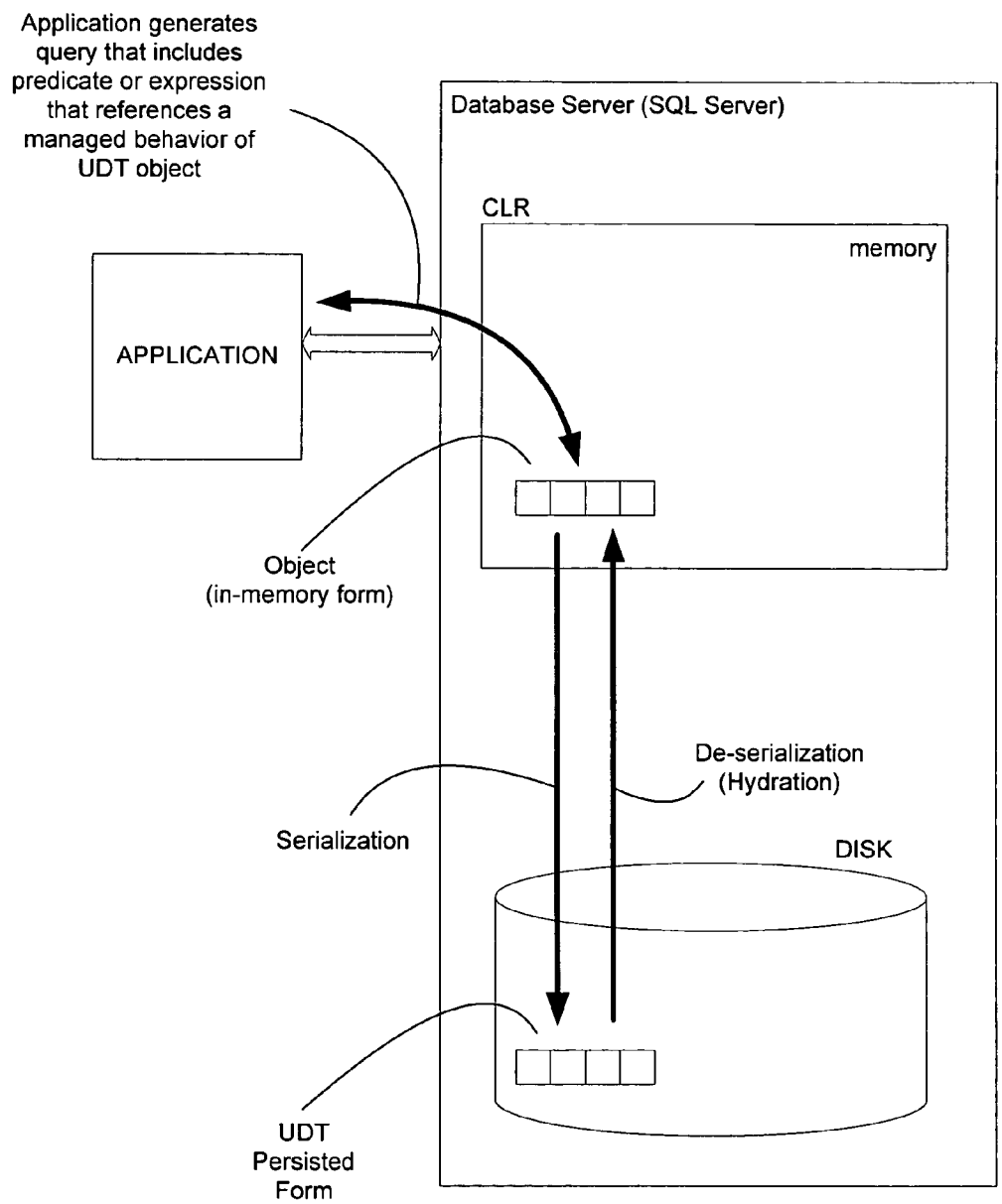
FIG. 2 is a block diagram illustrating the serialization and deserialization of an instance of a type that has been instantiated in managed code.
Figure 3:
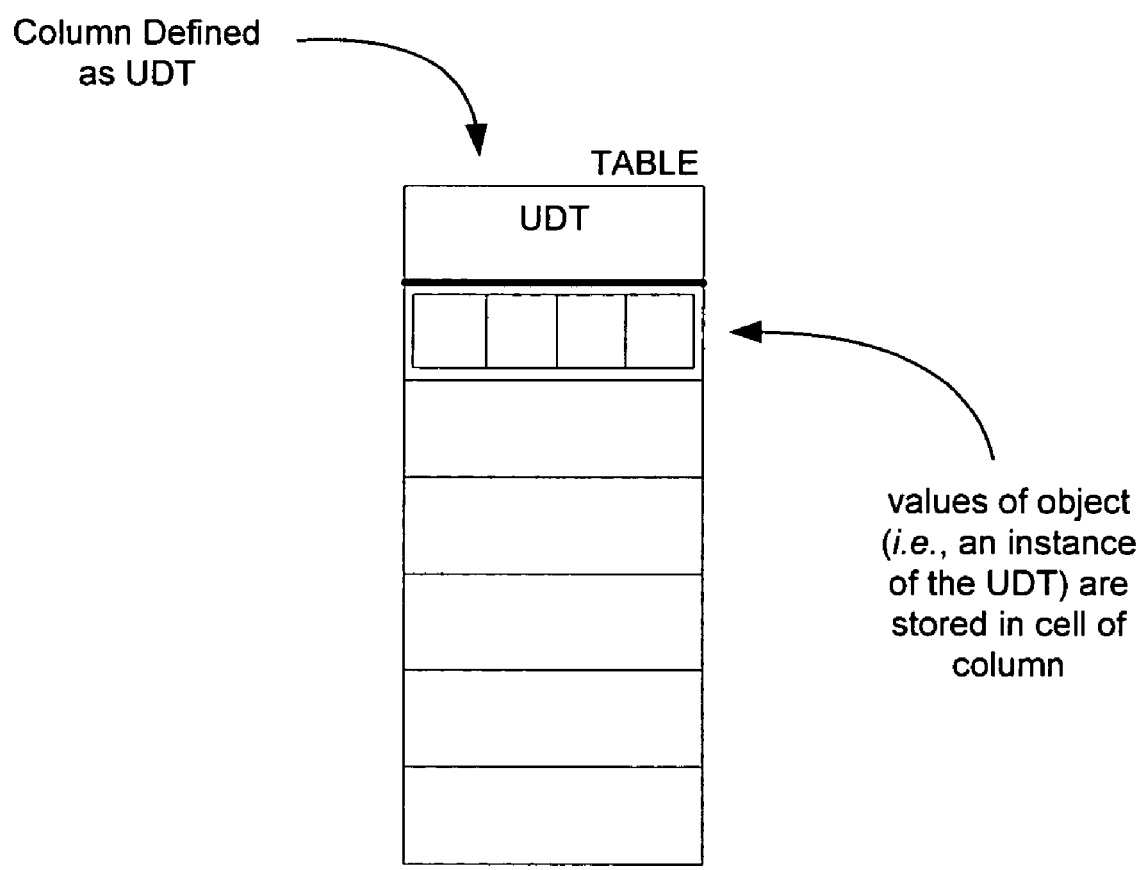
FIG. 3 is a diagram illustrating a database table in which an object of a User Defined Type has been persisted.
Figure 4:
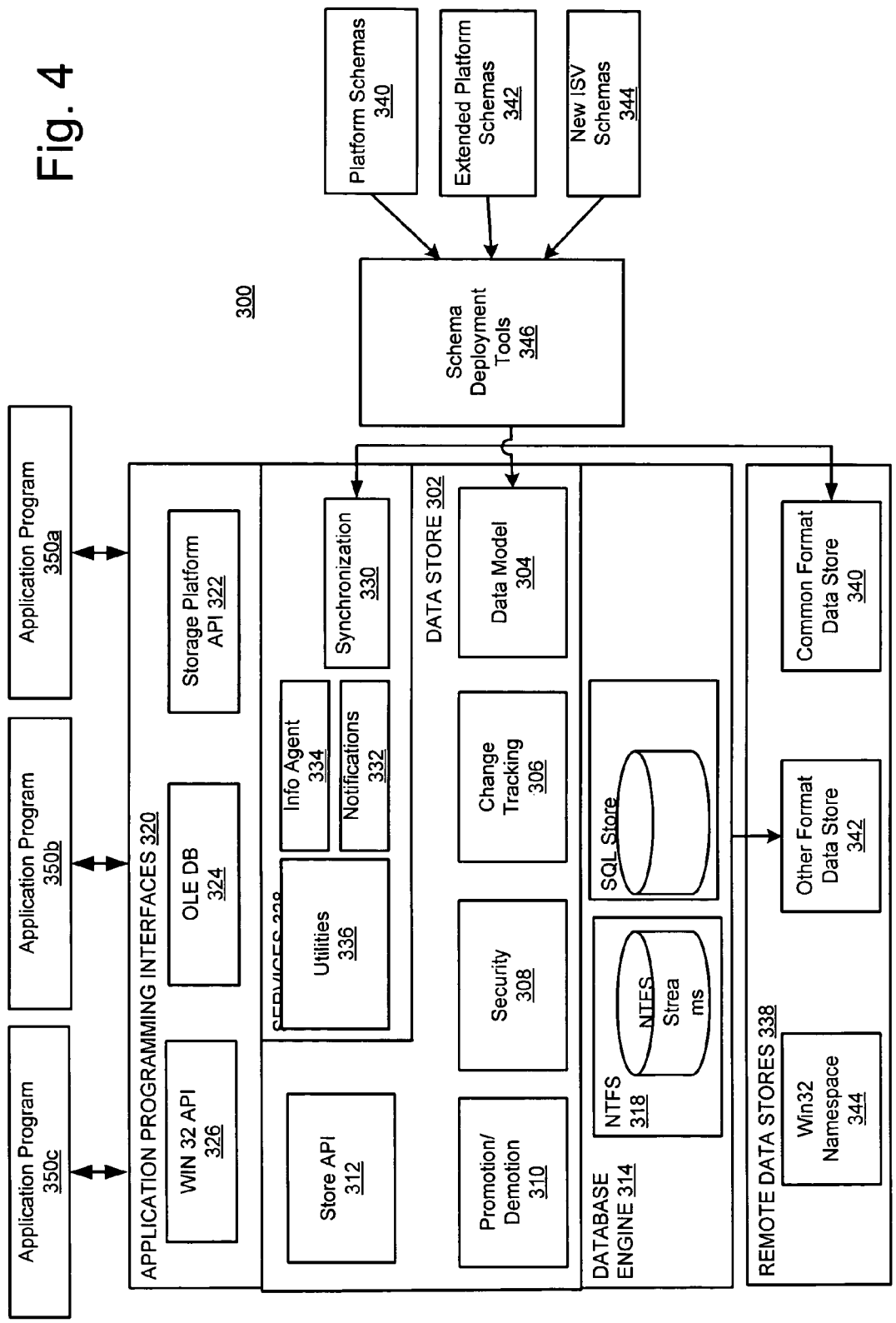
FIG. 4 is a block diagram illustrating an exemplary storage platform which may take advantage of the features of the present invention.
Figure 5:
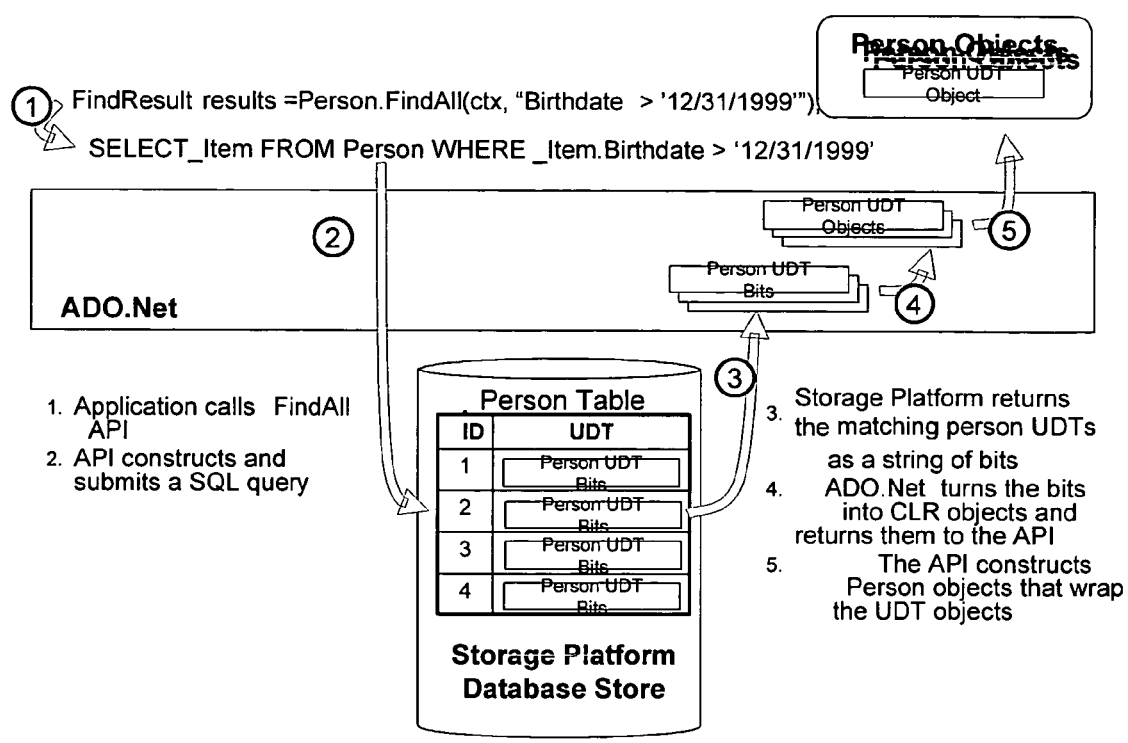
FIG. 5 is a diagram illustrating a process for executing a query against persisted objects of a user defined type in the context of the storage platform illustrated in FIG. 4.
Figure 6:
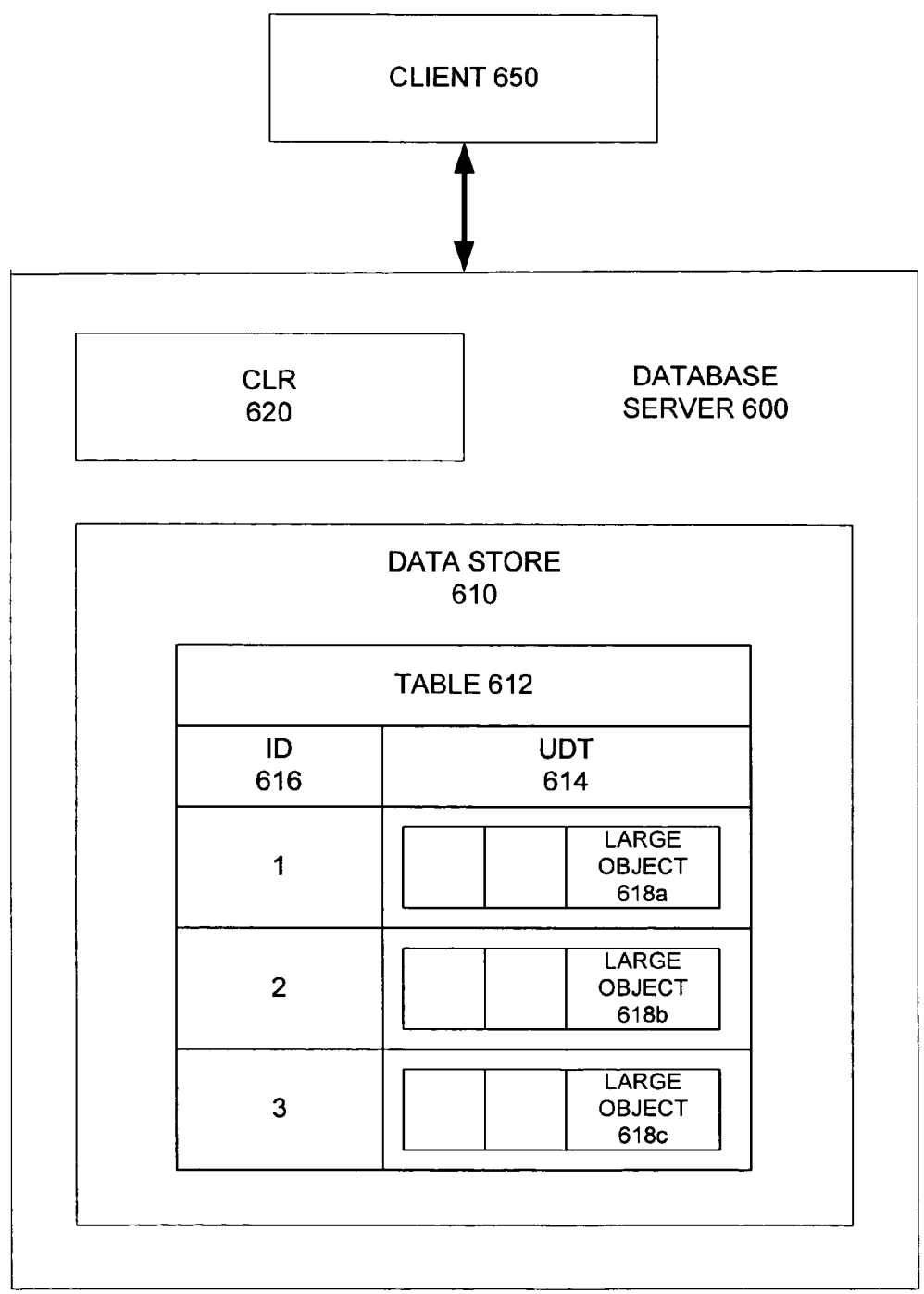
FIG. 6 is a block diagram illustrating an exemplary system for delayed fetching of members of a user defined type in accordance with the present invention.

An exemplary system for delayed fetching of designated members of a UDT in accordance with the present invention is shown un FIG. 6. Generally, database server 600 includes an underlying data store 610, which stores data in relational form such as in data table 612. Table 612 includes a UDT column 614 with a number of rows each including an instance of a UDT. Each UDT instance may, although need not necessarily, include a number of large objects 618a-c. Table 612 also includes a primary key column 616 which organizes the UDT instances according to a unique identifier such as a globally unique identifier (GUID). As should be appreciated, table 612 may also include other UDT columns and other relational columns (not shown). Client 650 enables a user to generate and submit queries to database server 600, and such queries may request a fetch of particular UDT instances from data store 610.

Database server 600 may also include a common language runtime (CLR) 620, which enables the UDT instances to be defined according to a CLR class definition. An exemplary class definition for a UDT is shown below:

```
Person
{
    String FirstName;
    String LastName;
    Blob Photo;
    Collection<Address> Addresses;
}
Address
{
    String Zip;
    Blob Map;
}
```

As stated above, in accordance with an aspect of the present invention, specific members of a UDT may be designated as delayable members. If a query is later submitted to database server 600 that requests a fetch of the UDT, then, upon request, the delayable members may be removed from the UDT as part of the query execution. The delayable members may then be re-fetched upon request at a later time. Delayable members may be designated by annotating them as such using a custom attribute recognized by the CLR 620. For example, delayable members may be annotated using an "IsDelayable" attribute. A UDT with exemplary annotated delayable members is shown below:

```
Person
{
    String FirstName;
    String LastName;
    [SqlUdtField(IsDelayable=true;)]
    SqlBytes Photo;
    MultiSet<Address> Addresses;
}
Address
{
    String Zip;
    [SqlUdtField(IsDelayable=true;)]
    SqlBytes Map;
}
```

Once the UDT has been defined and delayable members have been annotated, the query is registered with data store

610. Data store 610 will read the attributes of the UDT and identify the delayable members of the UDT based on the annotation. Upon registration of the UDT at data store 610, the UDT may be retrieved with delayed fetching for the annotated delayable members as set forth below.

Figure 7:
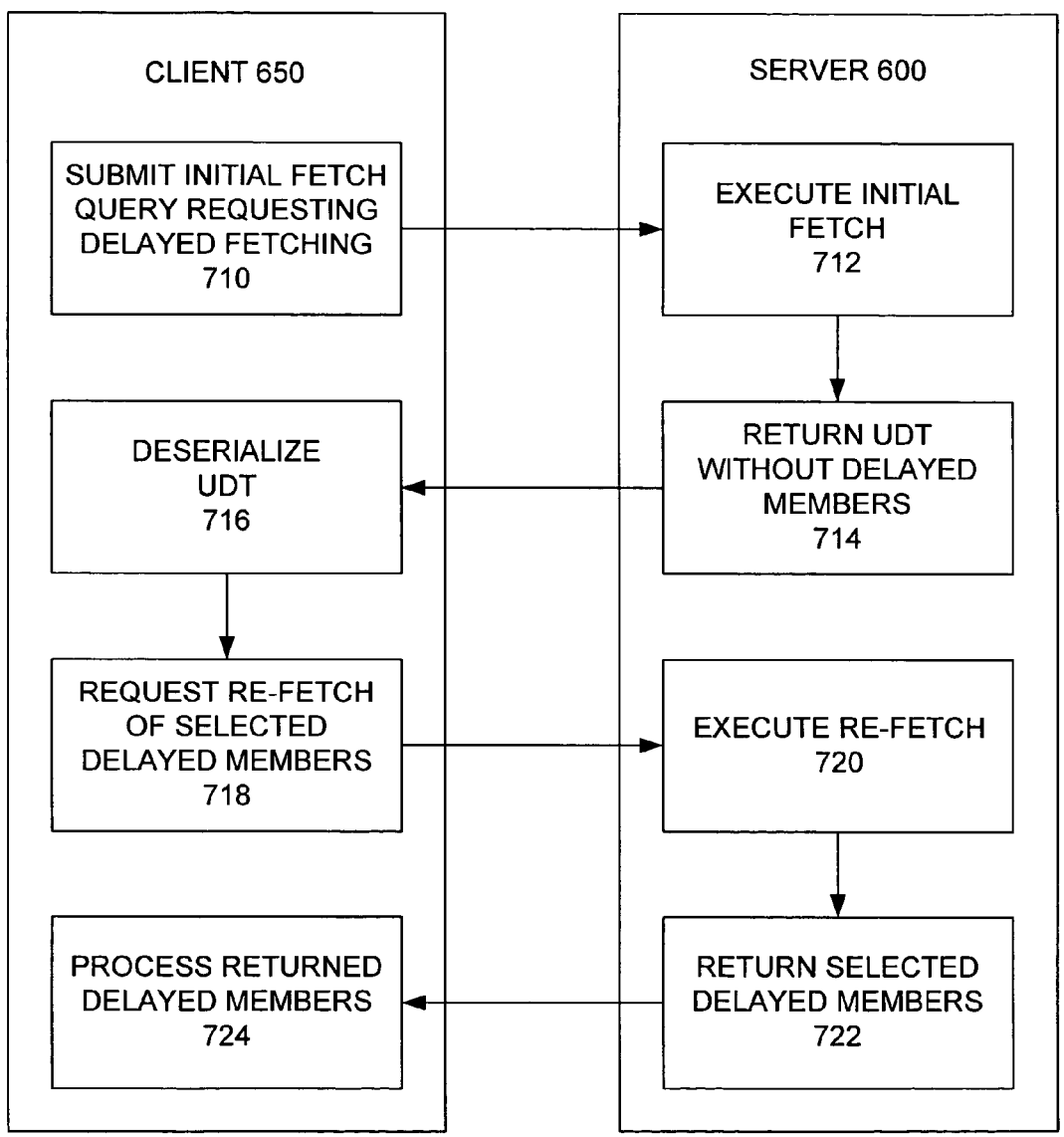
FIG. 7 is a flowchart of an exemplary method for delayed fetching of members of a user defined type in accordance with the present invention.

A flowchart of an exemplary method for delayed fetching of designated members of a UDT in accordance with the present invention is shown in FIG. 7. At act 710, an initial fetch query requesting a fetch of the UDT is submitted to database server 600. As stated above, to provide advantages such as preserving bandwidth and reducing the time required to perform the fetch operation, a fetch query in accordance with the present invention may request delayed fetching of designated delayable members of the UDT. Preferably, the fetch query does not, by default, delay the fetching of the delayable members. Rather, the fetch query preferably must include a specific request to invoke delayed fetching. Thus, to enable delayed fetching, a projection list of the SELECT statement may be extended to support a delayed fetching clause. Such a delayed fetching clause may be, for example, a WITH [REFERENCE] LOCATOR clause. An exemplary projection list including a WITH [REFERENCE] LOCATOR clause is shown below:

```
< column_specifier > ::= {
        column_name
    |    <Delayable-value>      [WITH ([REFERENCE]
LOCATOR)]
    | expression
    | IDENTITYCOL
    | ROWGUIDCOL
}
<Delayable-value> ::= {
        delayable_column_name
    | <Delayable-value>.<UDT-valued-udt-member>
    | TREAT (<Delayable-value> AS <type>)
}
<UDT-valued-udt-member>      ::= {
        <public-udt-valued-field>
    | <public-udt-valued-sql-property>
}
```

The syntax enhancement shown above enables delayed fetching for any UDT instance. Such a UDT instance may be, for example: a top level UDT, an embedded UDT-valued member within some other UDT, a UDT that has been cast to one of its subtypes or supertypes, or a combination of any of the first three types.

An exemplary fetch query requesting delayed fetching is shown below:
SELECT person_col WITH (LOCATOR)
FROM person_table
WHERE person_col.LastName='Jones';

There are two manners in which delayed fetching may be implemented: reference semantics and value semantics. In the reference semantics approach, the re-fetch operation retrieves the delayed members as of the time of the re-fetch operation itself. Thus, any changes made to the delayed members after the initial fetch are propagated and retrieved along with the re-fetch. In the value semantics approach, the re-fetch operation retrieves the delayable members as of the time when the initial fetch is executed. Thus, value semantics provides read consistency among the delayed and the non-delayed members. The implementation of reference semantics and value semantics is discussed throughout the description below.

Figure 8:
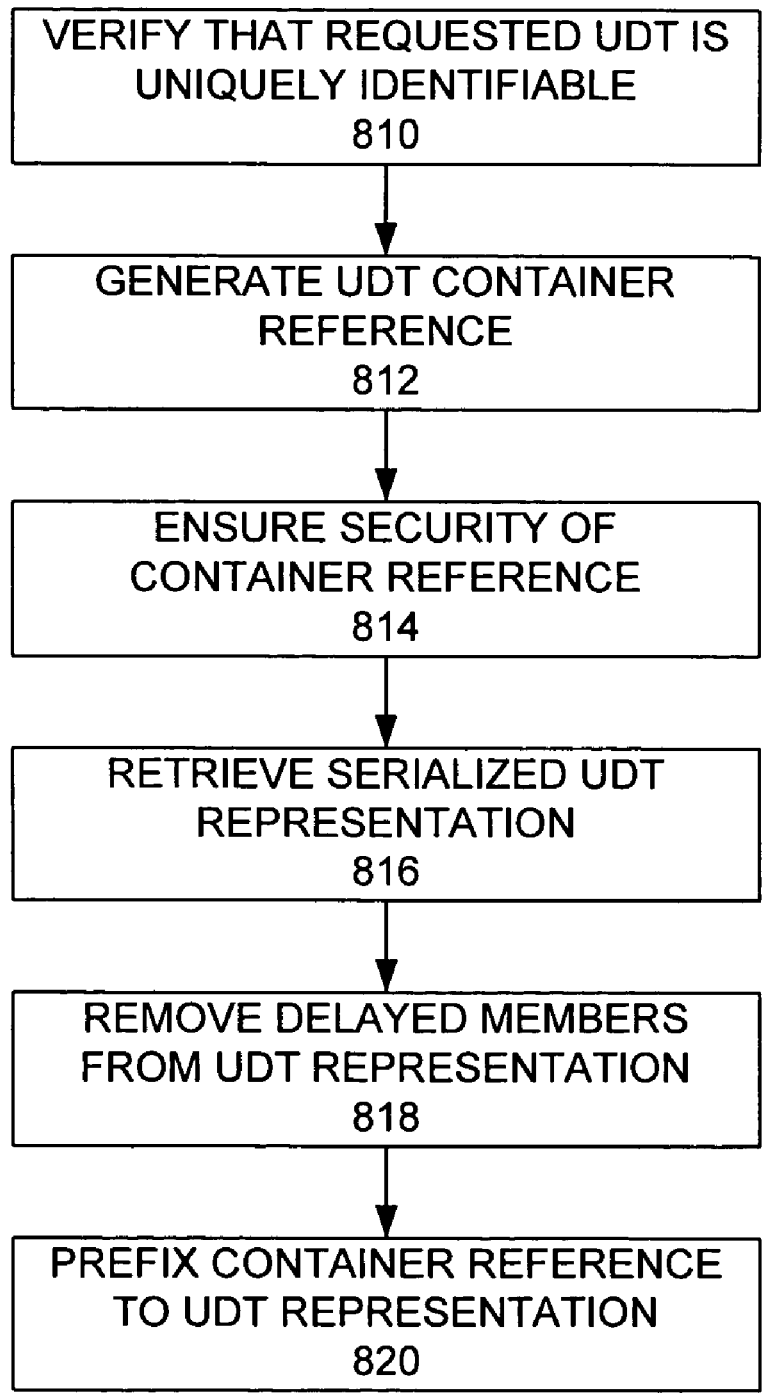
FIG. 8 is a flowchart of an exemplary method for executing an initial fetch of a user defined type in accordance with the present invention.

At act 712, the fetch query is executed at database server 600. An exemplary method for executing a fetch query in accordance with the present invention is shown in FIG. 8. Acts 810-820 shown in FIG. 8 are sub-acts within act 712. At act 810, database server 600 verifies that the requested UDT is uniquely identifiable. The verification involves establishing that the requested UDT is stored in a table or view to which an access path may be generated. Such an access path enables re-fetching of the exact same requested logical UDT at a later time. The verification may include ensuring that all tables in the access path contain either a primary key or a unique index such as, for example, key column 616. If the UDT is not uniquely identifiable, then an error message may be returned.

At act 812, database server 600 generates a UDT container reference. The UDT container reference includes the UDT access path discussed above and ultimately encodes all the logical names of databases, schemas, tables/views, key columns, and key column values for the UDT path. All information in the container reference is "logical" with respect to objects which may be accessed by client 650. Thus, for as long as the container reference is present, the semantics of the container reference are understandable to the client 650 in connection with actions and operations that may be requested by client 650. The container reference is not subject to implementation details of the database server 600. An additional grammar may be added to database server 600 to encode the container reference.

At act 814, database server 600 ensures that the UDT container reference does not compromise security with improper or unauthorized information disclosure. Act 814 is optional. Security may be achieved, for example, by verifying that a user submitting the query has access to all columns and values that are included in the key columns part of the access path. Alternatively, security may be achieved by encrypting the values and returning them in encrypted form.

At act 816, a serialized representation of the UDT instance is retrieved from data store 610. At act 818, the delayable members of the UDT are removed from the retrieved UDT. Specifically, as each UDT instance is being returned to the client 650, metadata is loaded for the specific type being returned, and delayable members are enumerated and logically removed from the serialized representation. At act 820, the retrieved UDT is prefixed with the UDT container reference. Thus, the instance is returned to the client 650 with the UDT container reference and the serialized form of the UDT omitting members marked as IsDelayable=true.

For value semantics, database server 600 performs some additional acts as part of the fetch query execution. Specifically, database server 600 ensures that the statement containing the fetch query is being executed within the context of a user transaction. Furthermore, server 600 generates and returns as part of the UDT instance an Update Sequence Marker (USM), which is a versioning timestamp used to provide read consistency on the re-fetch operation.

Returning to FIG. 7, at act 714, the UDT with removed delayed members and the prefixed container reference is returned to client 650. At act 716, the returned UDT is deserialized. As part of the deserialization process, a managed deserializer at the client 650 identifies the omitted, delayed UDT members, and, for each such delayed member, constructs a corresponding CLR type such as, for example, SqlBytes and SqlChars. The constructed CLR type for each delayed member includes the prefixed UDT container reference for the entire UDT as well as an individual member path for the individual delayed member. Thus, the CLR type instance for each member is a cookie that provides a path to the individual member within database server 600. The cookie is a sequence of bytes that unambiguously identifies an individual instance of a delayed member on the database server 600, but does not refer to client 650. Programs at client 650 generally do not make changes to the cookie and use the cookie in its original form in re-fetch requests to the database server 600.

Setting the full context of each delayed member including the individual member path is done at client 650 to achieve better performance and scalability. The client deserializer does a full type traversal on all returned UDT instances regardless of whether the instances include delayed members. Thus, as opposed to setting the full context at database server 600, setting the full context at client 650 does not require an additional traversal of the returned UDT. Furthermore, setting the full context at client 650 offloads additional work from the database server 600, resulting in a scalability gain.

The CLR types in accordance with the present invention may be enhanced to support a backed by cookie state. Furthermore, the types may be enhanced to return an exception if an attempt is made to use a corresponding instance when not fully materialized.

Importantly, the CLR types may also be enhanced to provide a "Fill" method that automatically re-fetches the full representation for a corresponding instance from the database server 600. The Fill method takes a connection to the database server 600 as an argument. Alternatively to using the Fill method, a reference to the server connection may be implicitly stored at client 650 during deserialization.

At act 718, client 650 submits a request to re-fetch a selected delayed member. The re-fetch operation enables the selected delayed member to be retrieved without retrieving the non-delayed members that were returned during the initial fetch. The re-fetch operation is implemented so as to minimize the amount and complication of tasks to be performed by the user. The re-fetch is preformed via the Fill methods on corresponding CLR type instances. These methods invoke a newly added remote procedure call (RPC) entry point that takes a cookie and returns a corresponding singleton delayed member.

Specifically, to re-fetch a particular member, the user need only call the Fill method for the corresponding instance and specify a connection to database server 600. For value semantics, the USM of the initial fetch is also provided. Upon invocation of the Fill method, a stored procedure is executed on the database server 600 that receives the UDT container reference, the corresponding individual member path, and, if applicable, the USM.

At act 720, the re-fetch operation is executed at database server 600. To execute the re-fetch, the database server entry point parses the UDT container reference using the delayed fetching grammar, and builds a query tree that can be executed to retrieve the entire UDT. Once the entire UDT is obtained, the individual member path information is used to traverse down to the selected individual member that needs to be returned. This operation may include casts between subtypes and supertypes of the instance. For value semantics, the provided USM is used to identify and retrieve a prior version of the requested member from the time of the initial fetch.

At act 722, after the requested member is located, it is returned back to client 650. At act 724, the returned member is received by client 650. The CLR type instance reads the member representation, sets the member representation to the backing representation, and sets the internal state of the instance to "filled".

Thus, as set forth above with reference to FIGS. 7 and 8, the present invention enables delayed retrieval of designated members of a UDT. In addition to providing methods for fetching UDT members from database server 600, the present invention may also be employed to submit an "inbound" UDT with delayed members to server 600. This feature of the present invention is particularly advantageous when client 650 makes a change to members of the UDT and returns the UDT or the individual changed members back to database server 600 for storage at data store 610. In this scenario, client 650, may submit the UDT or the individual changed members to database server 650 without having to first retrieve the delayable members of the UDT. Client 650 may return back to the database server 600 as an input parameter either an entire UDT instance that contains un-filled members or un-filled instances of a CLR type.

In the case of returning the entire UDT with un-filled members, a managed serializer on the client 650 sends the full cookie including the UDT reference 615 and the corresponding individual member path in place of each un-filled member value. On input, the database server 600 checks the UDT for embedded delayed members and expands and replaces any found delayed members. Expansion of the un-filled members is performed on the input boundary to guarantee the correct semantics. The members may be assigned from other instances, or from other versions of the same instance.

In the case of standalone instances of a CLR type, the client driver sends the cookie representation along with a metadata annotation indicating the identity of the instances. The metadata annotation makes it possible to differentiate between a cookie and an actual binary/character value with a matching sequence.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the present invention.

Figure 9:
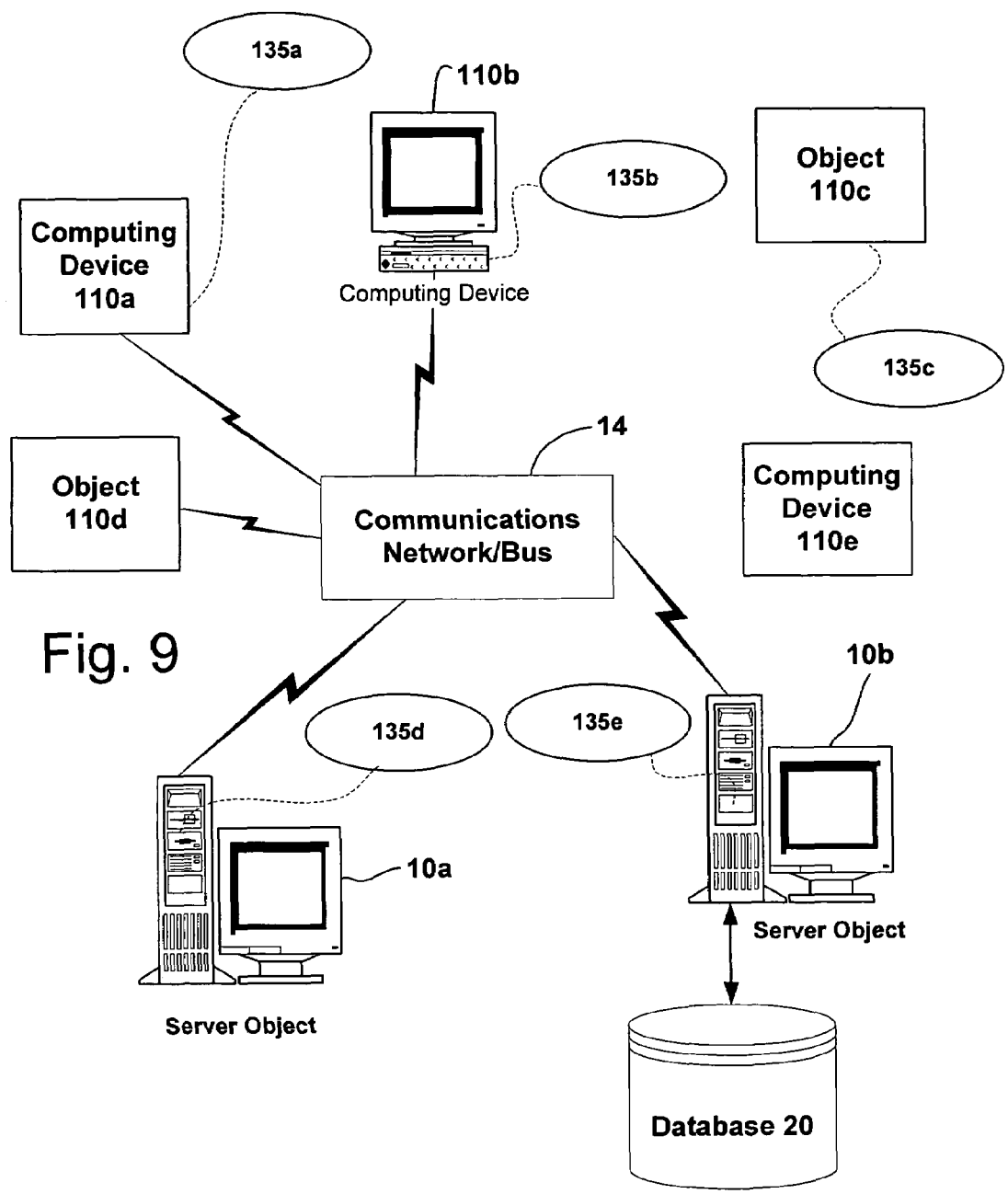
FIG. 9 is a block diagram representing an exemplary network environment having a variety of computing devices in which the present invention may be implemented.

FIG. 9 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 9, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 9 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110*a*, 110*b*, 110*c*, 110*d*, 110*e*, etc. and server computer 10*a*, 10*b*, etc. may be equipped with various application program modules or objects 135 and with connections or access to various types of storage elements or objects, across which files or data streams may be stored or to which portion(s) of files or data streams may be downloaded, transmitted or migrated. Any computer 10*a*, 10*b*, 110*a*, 110*b*, etc. may be responsible for the maintenance and updating of a database, memory, or other storage element 20 for storing data processed according to the invention. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other like devices, and databases 20.

Figure 10:
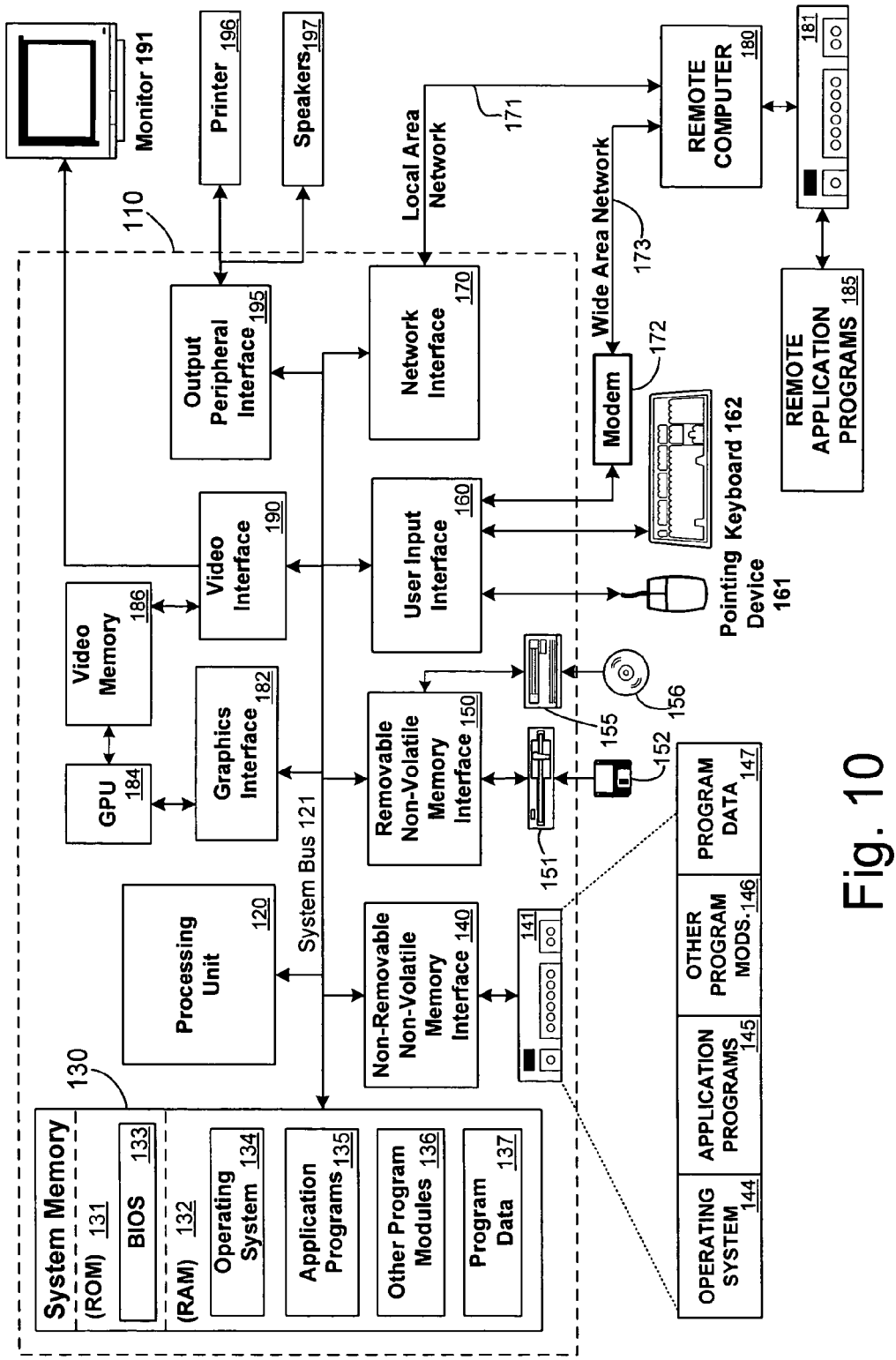
FIG. 10 is a block diagram representing an exemplary computing device in which the present invention may be implemented.

FIG. 10 and the following discussion are intended to provide a brief general description of a suitable computing device in connection with which the invention may be implemented. For example, any of the client and server computers or devices illustrated in FIG. 9 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 10 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 10, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10 provide storage of computer readable instructions, data structures, program modules and other data for the computer 110. In FIG. 10, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

As the foregoing illustrates, the present invention is directed to delayed fetching of designated members of a UDT. The present invention is particularly advantageous for delaying fetching of large objects such as, for example, digital photos, video, etc. It is understood that changes may be made to the embodiments described above without departing from the broad inventive concepts thereof. For example, while an embodiment of the present invention has been described above as being implemented in Microsoft's SQL SERVER database management system, it is understood that the present invention may be embodied in any database management system that supports the creation of user defined types. Additionally, while certain aspects of the present invention have been described as being embodied in the context of the WinFS storage platform described above, it is understood that those aspects of the present invention are by no means limited to implementation in that environment. Rather, the methods and systems of the present invention can be embodied in any system in which storage and retrieval of members of a user defined type is desirable. Accordingly, it is understood that the present invention is not limited to the particular embodiments disclosed, but is intended to cover all modifications that are within the spirit and scope of the invention as defined by the appended claims.

What is claimed:

1. A system for delayed fetching of a designated member of a user defined type comprising the designated member and a non-designated member, the system comprising:

a processor to execute computer-executable instructions; and memory having stored therein computer-executable instructions for performing steps comprising:

receiving from a client an initial fetch request to fetch the user defined type from a data store, the initial fetch request comprising instructions to fetch the non-designated member of the user defined type and to delay fetching of the designated member of the user defined type;

examining a UPDATE SEQUENCE MARKER maintained by the data store to identify a time when the initial fetch request was received by the data store;

generating a container reference to the user defined type that identifies a path to the user defined type within a data store;

retrieving a serialized representation of the user defined type from the data store;

removing only the designated member from the serialized representation whereby, after the removal, the non-designated member remains within the serialized representation;

attaching the container reference to the serialized representation;

generating a query response comprising the serialized representation that comprises the non-designated member, the query response further comprising the attached container reference and the UPDATE SEQUENCE MARKER;

sending the query response to the client;
receiving from the client a re-fetch request to re-fetch the designated member, the re-fetch request comprising the container reference and the UPDATE SEQUENCE MARKER the re-fetch request indicating a selectable first mode operating to retrieve delayed members at the time of the re-fetch operation and a selectable second mode operating to retrieve delayed members as of the time when the initial fetch was executed;
retrieving from the data store a version of the designated member identified by the UPDATE SEQUENCE MARKER based upon a selected mode; and
returning the retrieved version of the designated member to the client.

2. A computer readable medium having stored thereon computer executable instructions far delayed fetching of a designated member of a user defined type comprising the designated member and a non-designated member, the computer executable instructions comprising:
receiving from a client an initial fetch request to fetch the user defined type from a data store, the initial fetch request comprising instructions to fetch the non-designated member of the user defined type and to delay fetching of the designated member of the user defined type;
examining a UPDATE SEQUENCE MARKER maintained by the data store to identify a time when the initial fetch request was received by the data store;
generating a container reference to the user defined type that identifies a path to the user defined type within a data store;
retrieving a serialized representation of the user defined type from the data store;
removing only the designated member from the serialized representation whereby, after the removal, the non-designated member remains within the serialized representation;
attaching the container reference to the serialized representation;
generating a query response comprising the serialized representation that comprises the non-designated member, the query response further comprising the attached container reference and the UPDATE SEQUENCE MARKER;
sending the query response to the client;
receiving from the client re-fetch request to re-fetch the designated member, the re-fetch request comprising the container reference and the UPDATE SEQUENCE MARKER, the re-fetch request indicating a selectable first node operating to retrieve delayed members at the time of the re-fetch operation and a selectable second mode operating to retrieve delayed members as of the time when the initial fetch was executed;
retrieving from the data store a version of the designated member identified by the UPDATE SEQUENCE MARKER based upon a selected node; and
returning the retrieved version of the designated member to the client.

3. A method for delayed fetching of a designated member of a user defined type comprising the designated member and a non-designated member, the method comprising:
receiving from a client initial fetch request to fetch the user-defined type from a data store, the initial fetch request comprising instructions to fetch the non-designated member of the user defined type and to delay fetching of the designated member of the user defined type;
examining a UPDATE SEQUENCE MARKER maintained by the data store to identify a time when the initial fetch request was received by the data store,
generating a container reference to the user defined type that identifies a path to the user defined type within a data store;
retrieving a serialized representation of the user defined type from the data store;
removing only the designated member from the serialized representation whereby, after the removal, the non-designated member remains within the serialized representation;
attaching the container reference to the serialized representation;
generating a query response comprising the serialized representation that comprises the non-designated member, the query response further comprising the attached container reference and the UPDATE SEQUENCE MARKER;
sending the query response to the client;
receiving from the client a re-fetch request to re-fetch the designated member, the re-fetch request comprising the container reference and the UPDATE SEQUENCE MARKER, the re-fetch request indicating a selectable first node operating to retrieve delayed members at the time of the re-fetch operation and a selectable second node operating to re-fetch delayed member as of the time when the initial fetch was executed;
retrieving from the data store a version of the designated member identified by the UPDATE SEQUENCE MARKER based upon a selected node; and
returning the retrieved version of the designated member to the client.

4. The method of claim 3, further comprising ensuring the security of the container reference prior to attaching it to the serialized representation.

5. The method of claim 3, further comprising:
receiving a re-serialized representation of the user defined type wherein the designated member is replaced by context information comprising the container reference and an individual member path to the designated member;
replacing the context information with the designated member, the designated member identified based on the context information; and
storing the re-serialized representation at the data store.

6. The method of claim 3, further comprising:
receiving context information comprising the container reference and an individual member path to the designated member and receiving a metadata annotation identifying the context information as a path to a location of the designated member within the data store;
replacing the context information with the designated member, the designated member identified based on the context information; and
storing the designated member at the data store.

* * * * *